United States Patent
Oranth et al.

(10) Patent No.: US 10,213,742 B2
(45) Date of Patent: *Feb. 26, 2019

(54) MICRO FLOW FILTRATION SYSTEM AND FLOW FILTRATION METHOD

(71) Applicants: Norbert Oranth, Voerstetten (DE); Nadine Losleben, Mannheim (DE); Sascha Lutz, Neustadt (DE); Adelbert Grossmann, Eglfing (DE)

(72) Inventors: Norbert Oranth, Voerstetten (DE); Nadine Losleben, Mannheim (DE); Sascha Lutz, Neustadt (DE); Adelbert Grossmann, Eglfing (DE)

(73) Assignee: Hoffmann-La Roche, Inc., Little Falls, NJ (US)

( * ) Notice: Subject to any disclaimer, the term of this patent is extended or adjusted under 35 U.S.C. 154(b) by 354 days.

This patent is subject to a terminal disclaimer.

(21) Appl. No.: 14/386,097

(22) PCT Filed: Mar. 25, 2013

(86) PCT No.: PCT/EP2013/056298
§ 371 (c)(1),
(2) Date: Sep. 18, 2014

(87) PCT Pub. No.: WO2013/144091
PCT Pub. Date: Oct. 3, 2013

(65) Prior Publication Data
US 2015/0041395 A1   Feb. 12, 2015

(30) Foreign Application Priority Data
Mar. 29, 2012 (EP) .................... 12162012

(51) Int. Cl.
*B01D 61/14* (2006.01)
*B01D 61/18* (2006.01)
(Continued)

(52) U.S. Cl.
CPC ........... *B01D 61/22* (2013.01); *B01D 61/147* (2013.01); *B01D 61/18* (2013.01); *B01D 61/20* (2013.01);
(Continued)

(58) Field of Classification Search
None
See application file for complete search history.

(56) References Cited

U.S. PATENT DOCUMENTS

| 4,367,140 A | 1/1983 | Wilson |
| 5,674,394 A | 10/1997 | Whitmore |

(Continued)

FOREIGN PATENT DOCUMENTS

| CA | 2347375 A1 | 3/2001 |
| EP | 0995483 | 4/2000 |

(Continued)

OTHER PUBLICATIONS

The extended European Search Report, dated Sep. 6, 2012, in the related European Patent Application No. 12162012.4.

(Continued)

*Primary Examiner* — Krishnan S Menon

(57) ABSTRACT

A micro flow filtration system comprises a fluid circuitry (3) and a first reservoir (1) outside the circuitry (3) suitable for containing a fluid. The fluid circuitry (3) comprises a tangential flow filtration module (10) capable of separating the fluid sample into a retentate stream and a permeate stream upon passage of the fluid sample into the tangential flow filtration module (10) through an inlet feed (18). The fluid circuitry (3) further comprises a second reservoir (2) integrated in the fluid circuitry (3), a pump (5) for creating and driving a fluid flow, optionally at least one pressure sensor (6, 7 or 8) for acquiring and detecting data about the fluid sample, optionally a pressure regulator (9) for regulating the (Continued)

flow in the fluid circuitry (3) and a plurality of conduits (22) forming the fluid circuitry (3) together with the second reservoir (2), the TFF-module (10), the pump (5), the pressure sensor (6, 7 or 8) (if present) and the pressure regulator (9) (if present). The volume of the first reservoir (1) outside the circuitry (3) is significantly larger than the volume of the second reservoir (2). The first reservoir (1) outside the fluid circuitry (3) is connected to the circuitry (3) via a connection conduit (31) such that the fluid flows unidirectionally into the circuitry (3) until the first reservoir (1) is empty so that a continuous fluid flow from the first reservoir (1) to the circuitry (3) is established.

39 Claims, 3 Drawing Sheets

(51) Int. Cl.
  B01D 61/20 (2006.01)
  B01D 61/22 (2006.01)
(52) U.S. Cl.
  CPC ...... *B01D 2311/14* (2013.01); *B01D 2313/10* (2013.01); *B01D 2313/14* (2013.01); *B01D 2313/243* (2013.01); *B01D 2313/28* (2013.01); *B01D 2313/50* (2013.01); *B01D 2315/10* (2013.01); *B01D 2315/12* (2013.01)

(56) References Cited

U.S. PATENT DOCUMENTS

| | | | |
|---|---|---|---|
| 6,010,627 A | 1/2000 | Hood, III | |
| 6,432,630 B1 | 8/2002 | Blankenstein | |
| 7,270,744 B2 | 9/2007 | Petersen et al. | |
| 2001/0037966 A1 | 11/2001 | Petersen et al. | |
| 2002/0043487 A1 | 4/2002 | Schick | |
| 2003/0116487 A1 | 6/2003 | Petersen | |
| 2005/0092662 A1 | 5/2005 | Gilbert et al. | |
| 2005/0205498 A1 | 9/2005 | Sowemimo-Coker et al. | |
| 2006/0008913 A1 | 1/2006 | Angelescu et al. | |
| 2007/0000838 A1 | 1/2007 | Shih et al. | |
| 2007/0151924 A1 | 7/2007 | Mir et al. | |
| 2008/0047330 A1 | 2/2008 | Whitehouse et al. | |
| 2009/0101559 A1 | 4/2009 | Bala Subramaniam et al. | |
| 2011/0253629 A1 | 10/2011 | Jovanovic et al. | |

FOREIGN PATENT DOCUMENTS

| | | |
|---|---|---|
| GB | 2417913 A | 3/2006 |
| JP | 2008183470 A | 8/2008 |
| JP | 2009221137 A | 10/2009 |
| WO | 96/34679 | 11/1996 |
| WO | 2004022983 A2 | 3/2004 |
| WO | 2006/026253 | 3/2006 |
| WO | 2007/110203 | 10/2007 |

OTHER PUBLICATIONS

The International Search Report, dated Jun. 28, 2013, in the corresponding PCT Patent Application No. PCT/EP13/56298.
The Office Actions, dated Oct. 12, 2016 and Feb. 15, 2017, in U.S. Appl. No. 14/386,085.
The Office Action, dated Dec. 21, 2016, in U.S. Appl. No. 14/386,092.
The extended European Search Report, dated Jul. 19, 2012, in the related European Patent Application No. 12162009.0.
The International Search Report, dated May 3, 2013, in the related PCT Patent Application No. PCT/EP13/56296.
The International Search Report, dated May 31, 2013, in the related PCT Patent Application No. PCT/EP13/56294.
The extended European Search Report, dated Aug. 28, 2012, in the related European Patent Application No. 12162011.6.
Alam, et al., "A continuous membrane microbioreactor system for development of integrated modification and separation processes," Chemical Engineering Journal 167 (2011) 418-426.

MICRO FLOW FILTRATION SYSTEM AND FLOW FILTRATION METHOD

This application is a National Stage Application of PCT/EP2013/056298 filed Mar. 25, 2013, which claims priority from European Patent Application 12162012.4, filed on Mar. 29, 2012. The priority of both said PCT and European Patent Application are claimed. Each of prior mentioned applications is hereby incorporated by reference herein in its entirety.

The invention relates to a micro flow filtration system and a flow filtration method for increasing the concentration of a component contained in a fluid sample and/or exchange of the fluid in which a compound is contained. The system comprises a circuitry with a micro tangential flow filtration module having a semipermeable membrane capable of separating the fluid sample into a retentate stream containing the compound in the fluid and a permeate stream containing the fluid without the compound upon passage of the fluid sample. The fluid circuitry further comprises a reservoir integrated into the fluid circuitry, a pump and a plurality of conduits connecting the elements to the circuitry. Preferably, the system further comprises at least one pressure sensors and a flow pressure regulator within the fluid circuitry.

Fluid flow filtration systems for filtrating a fluid sample using a semipermeable membrane for purposes of purification, concentration or diafiltration are well known in the state of the art. These systems are used to increase the concentration of a component in a fluid for example for laboratory analysis or to remove particulate or molecular contaminants in the case of a purification. Such systems can also be applied to exchange the solvent containing a molecule or particulate of interest by diafiltration. The semipermeable membrane of such filtration systems can be located in a normal orientation to the flow direction within a flow channel in a way that the membrane covers the complete diameter of the flow channel which is characterized as a normal flow filtration or dead-end filtration, or the membrane surface can be located essentially parallel to the flow direction of the liquid sample which is known as tangential flow filtration system (TFF-system) or cross-flow filtration system.

Tangential flow filtration systems have the advantage that due to the direction of the flow of the fluid sample, which is essentially parallel to the membrane surface, an automatic sweeping and cleansing takes place so that higher fluxes and higher throughputs can often be attained with such systems in relation to corresponding normal flow filtration systems. Further, a large fraction of sample flows continuously over the membrane surface so that a clogging and fouling is discouraged in such systems. With respect to these and other advantages tangential flow filtration systems are often used in industrial and/or biotechnological processes.

During the passage of the fluid through the tangential flow filtration module having a semipermeable membrane the components of the solution that are smaller than the pore size of the membrane flow through the membrane as a permeate stream while larger components are retained in a retentate stream. The retentate stream is recirculated in the flow circuitry and is pumped across the membrane again in a continuous fashion. Such TFF-systems are used to significantly reduce the volume of the sample solution as a permeate stream is withdrawn from the system. So, the sample solution becomes concentrated when the system is driven in a concentration mode.

In other applications, the separation of two or more components in the solution such as a buffer has to be performed. Therefore, an exchange buffer solution (diafiltrate solution) typically but not obligatory not containing the component to be separated is added to the system so that one component is withdrawn as permeate stream and exchanged by another component, i.e. by the exchange buffer solution, so that in the end, for example, one buffer is exchanged by another buffer. A diafiltration mode and a concentration mode can be combined in systems using special control strategies.

The document WO 96/34679 describes a method for optimizing the performance of membrane based filtration systems taking into account the variety of flux and component passage behaviors occurring during operation in praxis. Such a system allows maximum recovery of desired component in a retentate from a sample solution containing two or more components in minimum time with minimum filtration area. So, an optimized diafiltration process can be established.

Tangential flow filtration systems are often used in the production of substances useful for biotechnological, chemical and therapeutical or diagnostic applications. In such industrial scale production processes the filtration process is usually used to increase the concentration of active ingredients. In tangential flow filtration systems the solution containing the components to be concentrated, for example proteins, particles, aggregates, ions, bacteria, viruses, nucleic acids, saccharides or the like, is located in a reservoir that is integrated into the fluid circuitry. The reservoir has a large volume in comparison to the volume of the rest of the circuitry. In lab-scale filtration systems the reservoir is approximately 0.1 to 5 l. In industrial scale systems the volume of the reservoir is respectively larger.

The concentration curve of such a system having a large reservoir integrated in the circuitry has an exponential form. The concentration curve shows the concentration over the process time and is quite flat at the beginning of the process when only a small amount of fluid relative to the overall fluid volume is withdrawn as a permeate stream. The more fluid is withdrawn and the more the fluid in the circuitry and the reservoir decreases, the more the concentration curve increases exponentially. In other words, a relatively small volume in the fluidic system with respect to the start volume leads to a high increase of the concentration curve. This behavior of the concentration curve is advantageous because the concentration in the solution is relatively small over a wide range of process time. So, during this period the risk of clogging or fouling is reduced in the process.

The large volume of the reservoir compared with the volume of the rest of the circuitry has the disadvantage that the minimal working volume of the circuitry increases. Due to the large internal surface of the reservoir a non-negligible volume of fluid remains in the reservoir, even if it is almost depleted. The reason for this fact is the adhesion force between fluid and reservoir surface. This leads to a reduction of the maximum concentration factor because the minimum working volume of the complete circuitry increases. Further, the large fluid-air interface in a large reservoir may promote unwanted reactions between components in the fluid and air. This problem appears in both lab-scale and industrial scale systems. The minimal working volume is sometimes also called minimal recirculation volume.

The development of an industrial scale filtration process is often very time consuming and cost consuming and needs a deep knowledge of the process parameter. A number of important parameters have to be qualified such as the membrane characteristics, the flow path configuration, dynamic influences and other process steps.

WO 2006/26253 A2 discloses a fluid circuitry with a reservoir integrated into the circuitry. The circuitry described is of a lab-scale system to acquire data useful for larger scale development qualification and validation of systems. To reduce the minimal working volume or minimal recirculation volume a special tank for housing the solution is used. The tank has an inlet and an outlet at the bottom. The disadvantage of this system is an inhomogeneous distribution of the components contained in a fluidic solution. Therefore, it is proposed that the tank comprises a mixing zone with a magnetic stirrer for mixing the fluid thereby creating a more homogeneous sample from which useful data can be acquired. Such special tank with a mixer is quite expensive and the complexity of the whole system is increased. Moreover, a magnetic stirrer induces shear stress on fluid components.

So, in the drug and biotech industry a strong demand still exists for a tangential flow filtration device being able to concentrate a component of a solution by a large concentration factor, even with small fluid sample volumes, preferably with a fluid volume of less than 100 ml. It is an object of the invention to provide an optimized TFF-system being able to provide such a large concentration factor wherein the fluid volume of the reservoir is sufficiently large compared with the minimal working volume of the system. Further, a clogging and fouling in the TFF-module should be avoided over a large time period during the filtration process.

The problem is solved by a micro flow filtration system for a fluid sample with the features according to claim 1. The object is also solved by a flow filtration method according to claim 12.

The micro tangential flow filtration system according to the invention for increasing the concentration of components contained in a fluid comprises a fluid circuitry and a first fluid reservoir. The first reservoir is an external reservoir outside the circuitry but has an unidirectional fluid connection to the circuitry. The first reservoir is a discrete element, like a tank. It can also be formed by container, a vessel, a canister or a kind of keg. The first reservoir is connected to the circuitry via a connection conduit which is preferably a capillary channel or a tube or the like. Preferably only one fluid connection from the first reservoir to the circuitry exists. The connection conduit is designed and arranged in such a manner that it prevents fluid from flowing back from the circuitry into the first reservoir. So, on the one hand an unidirectional flow of the fluid from the first reservoir into the circuitry is established. On the other hand the concentration of the fluid accommodated in the first reservoir is and remains constant during the complete filtration process in which a change of the concentration of the fluid in the circuitry takes place.

It is evident that the flow filtration system according to the invention can be used for concentration processes like increasing the concentration of components contained in a fluid sample and/or also for purification purposes. For all these applications the system and method according to the invention show their specific advantages.

In the context of the invention the term fluid is to be understood as a liquid, preferably a buffer solution or a fluid sample comprising components useful for therapeutic or diagnostic purposes (e.g. proteins). Also a body fluid, for example full blood, can be used as a fluid.

The fluid circuitry according to the invention comprises a tangential flow filtration module, a second fluid reservoir integrated in the fluid circuitry, a pump for creating and driving a fluid flow through the fluid circuitry, preferably at least one pressure sensor and also preferably a pressure regulator. The circuitry further comprises a plurality of conduits connecting all elements together.

The second reservoir is included in the circuitry and is preferably designed as a discrete fluidic element, for example a container, a tank or the like. Alternatively, the functionality of the second reservoir can also be provided by another structural element of the circuitry so that this structural element fulfills an additional function. For example, such element can be a flexible tube having an extended section and an enlarged inner lumen or a tube with an enlarged inner diameter and inner lumen so that a predetermined volume can be stored in the element or the respective amended section of the element. So, this structural element being a tube, for example, performs its original transport function and the additional reservoir function (or storage function) of the reservoir.

The tangential flow filtration module (TFF-module) has a feed inlet, a retentate outlet, a permeate outlet and a semi-permeable membrane capable of separating the fluid sample into a retentate stream and a permeate stream upon passage of the fluid sample into the tangential flow filtration module through the feed inlet. The TFF-module is a micro flow filtration module having a pore size of the membrane corresponding to a molecular weight cut off of approximately 1 to 1000 kD (kilo Dalton). In an optional embodiment the membrane of the TFF-module has a pore size in the range of approximately 2 µm to 0.05 µm, preferably of at most 0.1 µm. This is also the approximate membrane cut off range. The membrane could also be capable for performing an ultrafiltration so that the pore size of the membrane can be arranged of less than 0.1 µm until approximately a cut off range of 1 kD.

The second fluid reservoir has a reservoir inlet and a reservoir outlet both are in connection to the circuitry so that a fluid in the circuitry can flow through the reservoir. Optionally or additionally, the reservoir can feature an inlet to the first reservoir located outside the fluidic circuitry. The pump of the circuitry drives the fluid flow of the fluid sample through the fluid circuitry including the tangential flow filtration module and also through the second reservoir in the circuitry. In a preferred embodiment, at least two pressure sensors are used for acquiring and detecting data about the fluid sample. These data are usually pressure values for calculating a pressure difference value out of which the viscosity of the fluid contained in the circuitry can be determined. Optionally, a pressure regulator is used for regulating the pressure of the fluid sample in the circuitry, based on the results of these determinations.

These elements (TFF-module, second reservoir, pump, optionally pressure sensors and/or pressure regulator) form together with a plurality of conduits the circuitry through which the fluid stream is conducted. The arrangement of the first reservoir and the fluid circuitry including the second reservoir has the advantage that in the concentration mode a strict limitation between the fluid volume of the first reservoir and the fluid volume of the second reservoir (including the volume of the circuitry) and a strict limitation of the fluid contained therein is possible. The concentration of the fluid in the first reservoir and the concentration of the fluid in the circuitry are the same only at the beginning of the filtration process. During the rest of the concentration process the concentration of the fluid in the first reservoir is different from the concentration of the fluid in the circuitry due to the fact that the concentration in the circuitry changes over the process time. The concentration of the fluid in the first reservoir is generally known or predetermined.

Further, the concentration of the fluid in the first reservoir is constant and does not change, especially the concentration is not increased. In the circuitry the concentration changes during the process. The concentration and the volume in the circuitry is exactly defined as long as the first reservoir is not completely empty.

It is essential that there is no fluid flow or diffusion from the circuitry and especially the second reservoir into the first reservoir. This is ensured by the connection conduit. Therefore, the connection conduit has preferably a length that prevents an effective diffusion of molecules contained within the fluid from the second reservoir into the first reservoir during the time of the filtration process and/or a diameter which is less than the diameter of the circuitry and/or less than the diameter of the second reservoir. In addition or alternatively a valve or a back-pressure valve can be established in the connection conduit between the first reservoir and the circuitry. It is also possible that the pressure in the circuitry is controlled in such a manner that the pressure in the circuitry is less than the pressure in the first reservoir and/or in the connection conduit. In a preferred embodiment the connection conduit is designed as a thin and long tube so that a fluid stream from the circuitry into the first reservoir is reliably prevented.

In a preferred embodiment the connection conduit has a diameter of at most 1 mm, preferably of at most 0.75 mm and particularly preferably of at most 0.5 mm. Such a conduit is advantageous with respect to the prevention of a flowing back of fluid and/or of a diffusion of molecules contained within the fluid from the circuitry into the first reservoir. In addition or alternatively the connection conduit has a length of at least 10 mm, preferably of at least 50 mm and particularly preferably of at least 100 mm. It is also preferred that a length of the connection conduit is at least 200 mm, 300 mm or more.

The use of a connection conduit between the external first reservoir and the circuitry has the advantage that the first reservoir which is a discrete element and is preferably designed as a container can be disposable or separable from the circuitry. So, the first reservoir can be separated from the circuitry. This is advantageous with respect to the exchange of the reservoir and its content, with respect to the filling or a possible re-filling of the first reservoir and especially with respect to the cleaning of the reservoir.

The system according to the invention was developed on basis of the inventive idea that with a large internal reservoir, which is integrated in the fluid circuitry, the minimal recirculation volume of the circuitry increases. On the other hand, the concentration curve, which shows the concentration over the time during operation of the flow filtration system, shows an exponential behavior which is advantageous due to the reduction of clogging and fouling effects of the membrane of the TFF-module. To avoid an increase of the minimal recirculation volume of the circuitry the internal reservoir of the circuitry can be withdrawn and exchanged with an external positioned reservoir. It was realized that this is no appropriate option although the external reservoir has no influence to the minimal working volume of the circuitry. In case of an external positioned reservoir the behavior of the concentration in the flow filtration module is disadvantageous. The concentration curve shows linear behavior so that a relatively high increase of the concentration in the module is generated from the beginning of the filtration process. Therefore, the system shows a higher risk to clogging and fouling reducing the permeate flow rate. Further, the viscosity of the fluid sample increases demanding an increase of the system's pressure and complicate the achievement of a constant transmembrane pressure over the whole concentration process.

It was realized that the problem is solved with a small internal reservoir which is integrated in the circuitry and a significantly larger external reservoir which is not integrated in the circuitry but in fluid connection with the circuitry such that the fluid flows unidirectionally from the first reservoir into the circuitry. The fluid connection between the first reservoir and the circuitry is designed by a connection conduit like a tube, a flexible tube or a fluid channel. So, the fluid flowing from the first reservoir into the circuitry and through the circuitry is not flowing back through or into the first reservoir. Therefore, preferably only one unidirectional connection between the external first reservoir and the circuitry exists.

There is a continuous fluid flow established from the first reservoir into the circuitry until the first reservoir is essentially empty. So, as long as fluid, which can be depleted, remains in the first reservoir the volume of the fluid contained in the circuitry remains constant during operation of the TFF-module.

The external first reservoir is the main reservoir for the fluid sample to be processed (in a concentration mode). In a system with such combination of the two reservoirs, the concentration of the fluid shows a behavior which corresponds to the combination of the behavior of the two versions of state of the art filtration systems.

The combined inventive system shows a linear concentration curve until the external reservoir is empty and as long as fluid flows from the first reservoir into the circuitry. If the external reservoir is empty an exponential increase of the concentration starts. So, the exponential phase of the concentration curve can be delayed using the second reservoir. Because the second reservoir is significantly smaller than the first external reservoir, its influence to the minimal recirculation volume or the minimal working volume is very small or negligible. Additionally effects derived from a large fluid-air interface can also be reduced. The external first reservoir does not make a contribution to the recirculation volume of the circuitry, so it can be as large as desired.

The slope of the concentration curve during the linear phase can be determined and adjusted with respect to the ratio of the external reservoir to the internal reservoir, e.g. the ratio of the volume of the external reservoir to the volume of the circuitry including the internal (second) reservoir.

It was recognized that the transition point between the linear phase and the exponential phase of the concentration curve depends on the two reservoir volumes. Therefore, preferably the first reservoir has a volume which is at least two times larger than the volume of the circuitry (including the second reservoir). It is further preferred that the volume of the first reservoir is at least five times larger than the volume of the circuitry, further preferably at least ten times larger or particularly preferably at least 15 times larger than the volume of the circuitry. It is also preferred that the first reservoirs volume is at least 50 times larger than the volume of the circuitry. In other embodiments the first reservoir's volume is preferably at least 100 times larger, particularly preferably at least 1000 times larger than the volume of the circuitry. So, a large fluid batch can be handled in the system without increasing the volume of the circuitry and therefore without increasing the minimal working volume of the system. An increase of the minimal working volume of the system leads to a restriction in the maximal concentration rate that can be performed with the system.

Although the fluid volumes to be handled are not restricted to an upper limit, the TFF-system is usually used for fluid and liquid batches of at most 150 ml, preferably of at most 100 ml. The system is preferably suitable to perform a purification or concentration of liquid batches of at most 20 ml, also preferably of at most 10 ml. Even smaller fluid volumes of at most 2 ml or 1 ml can also be concentrated. So, the start volume of the concentration process is preferably in the range between 150 ml to 1 ml. The first and the second reservoir have a respective volume. The volume of the first reservoir is normally in the range of the start fluid volume.

The system according to the invention can be used for concentrating a component contained in a fluid sample like a protein or a molecule or the like. If the system is used in such concentration mode the first reservoir and the second reservoir both contain the same fluid sample. Optionally further external reservoirs can be added in addition so that one or more components in a solution can be exchanged.

In a preferred embodiment of the TFF-system the volume of the second reservoir is at most 2 ml, preferably at most 1 ml. A system with such a dimensioned second reservoir is usually used in a laboratory. Small amounts of a solution can be handled and the influence of the second reservoir to the minimal working volume or minimal recirculation volume is restricted. In special embodiments the second reservoir is preferably at most 0.7 ml or particularly preferably at most 0.5 ml. A second reservoir of this volume has the advantage that the influence to the minimal working volume is further restricted and fluid batches of 100 ml or less, preferably of at most 20 ml, can be purified so that a maximal concentration rate of at least 10, preferably of at least 40, can be reached. The maximal concentration rate can also be preferably at least 100, particularly preferably at least 1000.

In a preferred embodiment of the invention the fluid circuitry comprises an optical measuring device for acquiring data related to the concentration of the components contained in the fluid sample. Such an optical measuring device can be a cuvette or the like combined with a suitable light source, a monochromator or filter equipment and a detection unit for measuring the remaining light after passing the sample. With such an optical measuring device integrated into the fluid circuitry it is possible to continuously detect the actual concentration of components contained in the fluid sample during the operation of the system. So, an online determination and monitoring of the concentration or the concentration change of the components contained in the fluid sample are easily possible.

The object of the invention is also solved with a flow filtration method having the features of claim 12. The method preferably for increasing the concentration of component contained in a fluid sample or for purification uses a tangential flow filtration module which is part of a fluid circuitry of a micro flow filtration system. The system also comprises a first reservoir which is connected via a connection conduit with the circuitry in such a manner that a fluid flows unidirectionally from the first reservoir into the circuitry. The connection conduit prevents fluid from flowing back from the circuitry into the first reservoir. So, the concentration of the fluid in the first reservoir is constant, in particular during the whole filtration process.

After providing a micro flow filtration system as described above, the first reservoir is filled with a fluid sample. The whole circuitry including the second reservoir is then filled with the sample due to the pump of the circuitry starting to work. Preferably the second reservoir is directly or indirectly (via the circuitry) filled before the rest of the circuitry or the complete circuitry is filled with fluid. If the circuitry does not contain any fluid at the beginning of the filling process, the pump preferably generates an underpressure so that fluid is sucked into the circuitry and/or into the second reservoir. The circuitry can also be filled using other known forces or means.

Preferably the circuitry also comprises a vent to let escape air or gas during the filling process of the empty circuitry. So, air bubbles in the system are avoided so that a processing free of disturbances and/or free of artefacts is possible.

In the next step the fluid sample is driven through the circuitry and passes the TFF-module. Thereby, an amount of fluid is (continually) withdrawn from the circuitry as permeate stream. The concentration of the component in the fluid sample in the circuitry is thereby increasing. In the case of purification the concentration of the component in the retentate stream increases while the permeate stream is the purified fluid solution.

In the next step preferably a continuous flow of fluid from the first reservoir to the second reservoir is established until the first reservoir is almost empty. So, as long as enough fluid is contained in the first reservoir to establish a continuous flow of fluid, the amount of fluid withdrawn in the filtration module is substituted by the same amount of fluid from the first reservoir. During operation of the system the permeate stream is balanced by additional fluid from the first reservoir which is conducted into the circuitry. A regulator like a pressure regulator or a valve preferably controls the fluid flow and/or the pressure within the circuitry. The fluid flow is particularly preferable controlled by controlling and/or adjusting the pump of the circuitry.

The concentration curve of the component (concentration versus processing time) shows a linear behavior as long as fluid is contained in the first reservoir. The volume of the first reservoir has no influence to the minimal working volume of the circuitry. The slope of the concentration curve in the linear phase depends on the volume of the fluidic circuitry and on the flux of the fluid through the filtration module, e.g. it depends on the flux of the permeate stream. Further, the actual concentration is also depending on the start concentration of the components contained in the fluid sample.

Preferably the slope of the concentration curve in the linear phase is adjusted to a low value by the choice of suitable dimensions of the first and of the second reservoir and the volume of the fluidic circuitry and the permeate flow rate so that the concentration increases at the beginning of the filtration process only with a small slope. The adjustment is performed as described above.

When the first reservoir is depleted, the flow from the first reservoir into the circuitry stops. Then, the filtration system shows the same behavior as the known filtration systems in the state of the art with an internal reservoir. The only difference is that the second reservoir is sufficiently small in relation to the starting volume of the overall system. From this point on during the operation of the system, the time-dependent course of the concentration shows an exponential behavior wherein the concentration rate increases exponentially during this exponential phase of the operation. So, there is a high increase of the concentration at the end of the process. Therefore, the inventive system and the inventive method both avoid a clogging and a fouling of the membrane of the filtration module over the longest time period of operation.

In a preferred embodiment of the method the concentration of the components in the fluid sample is monitored. Preferably the operation of the system can be stopped due to a predetermined end value, e.g. a concentration increase, an end concentration or an end volume or after a defined time. The fluid flow in the circuitry can also be stopped if the concentration increase reaches a designated concentration rate or if a designated targeted sample concentration is reached. The pump of the circuitry is stopped then. Also preferably the fluid flow can be stopped if the amount of the fluid sample contained in the circuitry reaches the minimum working volume of the circuitry.

The minimum working volume or minimum recirculation volume is defined as a minimal volume with which the circuitry can be driven without pumping air into the conduits or the circuitry. So, the minimal working volume is defined as the volume of all conduits in the circuitry connecting the elements in addition to the fluid volume which can be contained in pressure regulator or valve (if present), the at least one pressure sensor (if present), the pump and the tangential flow filtration module plus an amount of fluid which has to be in the conduits of the second reservoir and optionally the volume of the optical measuring device and/or the viscosity measuring device. The volume of the second reservoir integrated in the fluid circuitry is taken into account as so far as the second reservoir must contain a suitable volume of fluid so that no air, which is contained in the second reservoir when the fluid amount decreases, is pumped into the connecting conduit. This minimal fluid volume to be contained within the second reservoir is the partial volume of the second reservoir to be considered for the determination of the overall minimal working volume of the circuitry.

The method according to the invention preferably allows an increase in concentration of the components in the solution by a factor of at least two, further preferably at least ten and also further preferably of at least 50. The maximal factor of increase in concentration depends on i.e. the start volume of the solution in the first reservoir in relation to the minimal working volume of the circuitry. Optionally, the factor of increase in concentration is preferably at least 100, particularly preferably at least 1000. A system having a first reservoir with a fluid volume contained of 150 ml and a minimal working volume of 100 µl shows a maximum increasing factor in concentration of 1500. In such a system, the volume of the second reservoir in the circuitry is approximately between 1 ml to 0.5 ml.

In a preferred embodiment of the method the slope of the concentration curve during the essentially linear phase of the concentration process is preferably at most 0.5, further preferably at most 0.2, further preferably at most 0.1, further preferably at most 0.05, further preferably at most 0.02. The concentration curve is defined as the concentration over the operation time which is similar to the concentration in relation to the permeate stream or the flux of the filtration module. The slope of the concentration curve is similar to the change in concentration over the time. So, the slope of the concentration curve in the linear phase is particularly preferably at most 0.01, further preferably at most 0.005, further preferably at most 0.002, further preferably at most 0.001, further preferably at most 0.0005, further preferably at most 0.0002, particularly preferably at most 0.0001, and further particularly preferably at most 0.00001. The unit of the slope of the concentration curve is milligram per milliliter and second.

Preferably the method contains the step of controlling the flow from the first fluid reservoir into the circuitry in such a manner that a predetermined pressure or a predetermined flow in the circuitry is adjusted. The flow from the first reservoir can also be controlled in a manner that a predetermined amount of sample fluid is contained in the circuitry.

Preferably the fluid of the first reservoir flows directly into the second reservoir of the circuitry, preferably via a direct-line connection conduit.

During the flow of the fluid from the first reservoir into the circuitry, the flow is controlled by a pressure force which results from a pressure difference between fluidic circuitry and the first reservoir. Optionally the respective amount of fluid is sucked out of the first reservoir into the circuitry. It is preferred that the flow of the fluid from the first reservoir is controlled in such a manner that the volume of the fluid contained in the second reservoir and/or in the circuitry is essentially constant (as long as the first reservoir is filled).

During the development of the system and method according to the invention it was recognized that with respect to the concentration curve the region in which the transition from the linear behavior to the exponential behavior of the system takes place can be adjusted. Therefore, choosing and adjusting a start volume contained in the first reservoir is performed preferably in such a manner that the ratio of the fluid volume in the circuitry to the start fluid volume in the first reservoir is adjusted. This ratio is predetermined in such manner that the transition zone between the linear behavior of the concentration curve and the exponential behavior of the concentration curve is in a predetermined region. Preferably the transition from linear behavior to exponential behavior takes place in the end phase of operation, preferably if the amount of the volume of the solution is reduced to at least 50% of the start volume, preferably to at least 10% of the start volume, preferably to at least 5% of the start volume, also preferably to at least 2% of the start volume. Optionally, the amount of the volume of the solution is reduced to at least 0.5% of the start volume when the transition from linear behavior to exponential behavior takes place.

The invention is illustrated in more detail hereafter based on particular embodiments shown in the figures. The technical features shown therein can be used individually or in combination to create preferred embodiments of the invention. The described embodiments do not represent any limitation of the invention defined in its generality by the claims.

In the figures:

FIG. 1 *a, b* each shows a schematic view of a tangential flow filtration system according to the prior art together with a schematic view of the theoretical concentration curve of such system;

In the description of the figures the invention is illustrated using the example of increasing the concentration of a component contained in a fluid. It can also be used for at least purification purposes. This example does not limit the scope of the invention.

Figure 1B:
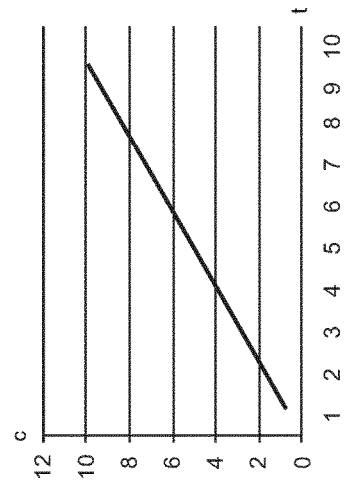
Figure 1B:
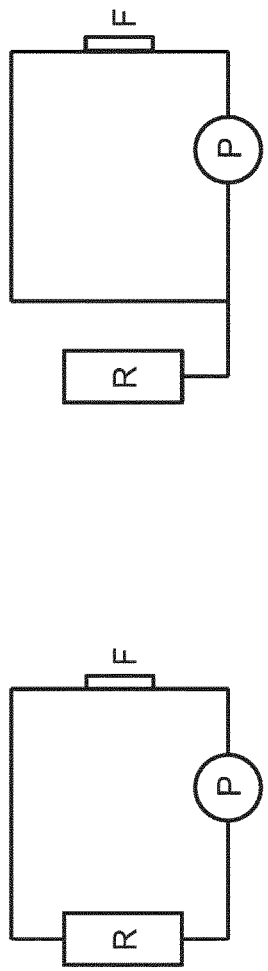
Figure 1A:
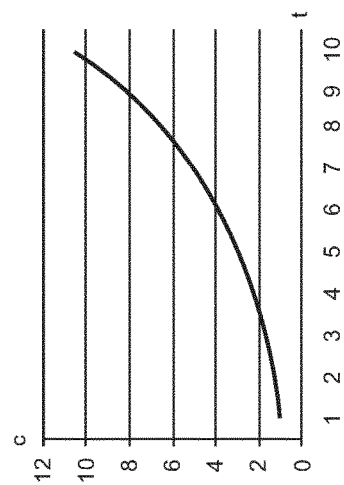

FIG. 1*a* shows a principal schematic view of a filtration system having a circuitTy of which only the pump P and the filtration module F and the reservoir R are shown. The reservoir R is integrated in the circuitry. The concentration curve shows the concentration over the time in principal. It is clearly shown that the concentration curve has an exponential behavior. After a time of 30 min the concentration increases from a start concentration of 1 mg/ml to an amount of 1.14 mg/ml. After 200 min the concentration reaches a value of 5 mg/ml. At a time of 248 min the concentration reaches an amount of approximately 125 mg/ml. So, the increase of the concentration at the beginning is relatively smooth. Thereby, the risk of clogging and fouling of the membrane is reduced. As mentioned before, this kind of circuitry has the disadvantage that the volume of the reservoir R has to be considered in the minimal working volume of the circuitry which lets the minimal working volume increase and has the demand to implement a mixer into the reservoir if the formation of concentration gradients in the reservoir during the filtration process has to be avoided. So, the maximum possible concentration factor is limited.

FIG. 1b shows a filtration system with a circuitry in which the pump P and the filtration module F are integrated. The reservoir R is located outside the circuitry and is in fluid connection to the circuitry. The fluid flows unidirectional from the reservoir R into the circuitry. In this configuration the volume of the reservoir R does not have to be considered in the minimal working volume. So, the minimal working volume is very low. The disadvantage of this system is that the concentration rises linear over the time. At a time of 30 min the concentration is increased from a start concentration of 1 mg/ml to an actual concentration of 19 mg/ml. At a time of 200 min the concentration value is 121 mg/ml. So, a relative large increase of the concentration takes place from the start of the operation. This leads to a high risk of clogging and fouling in the system already at early phases of the filtration.

Figure 2:
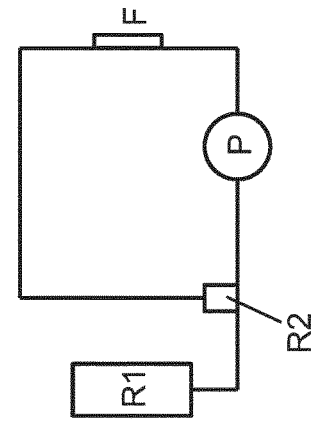
FIG. 2 shows a schematic view of the inventive system.

FIG. 2 shows a principal schematic view of the filtration system according to the invention. In this system two reservoirs are used. One small reservoir R2 is integrated in the circuitry in which also the pump P and the filtration module F are integrated. The large reservoir R1 is outside the circuitry and is in fluid connection to the circuitry. In this example, the reservoir R1 has a volume of 15 ml and the reservoir R2 has a volume of 1 ml. The minimum recirculation volume of the fluidic circuitry accounts to 100 µl.

Figure 3:
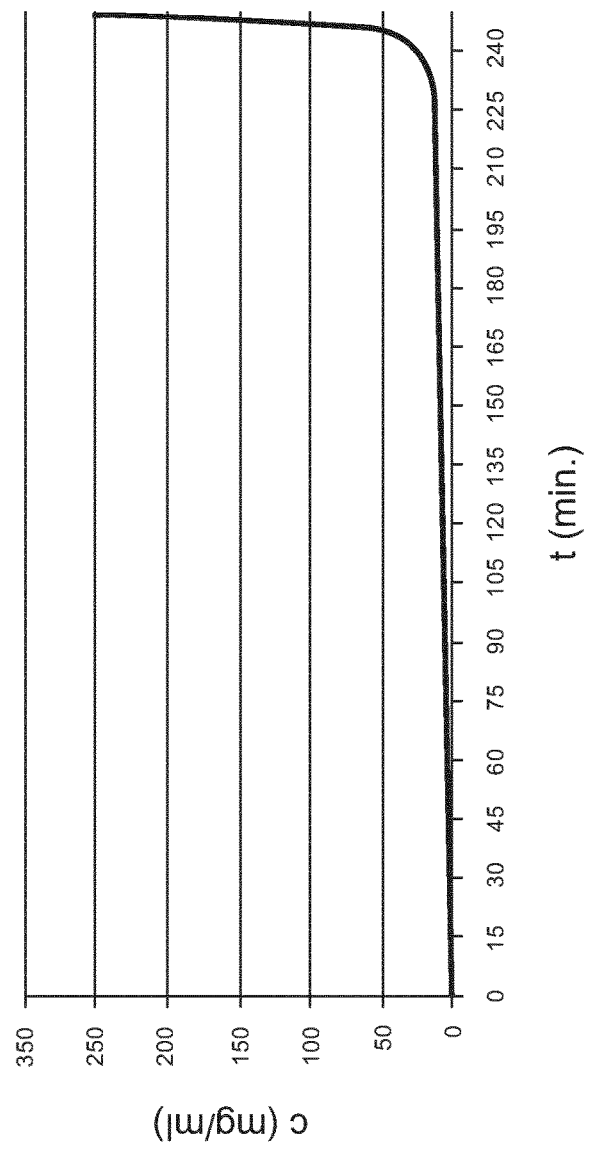
FIG. 3 shows a schematic view of the concentration curve of a tangential flow filtration system according to the invention.

FIG. 3 shows the theoretical behavior of the concentration over the time in a system according to the invention as shown in FIG. 2. The concentration curve shows a linear increase until a time of 232 min and thereafter an exponential increase. It is shown that the linear increase of the concentration over the time has a sufficiently lower slope than the concentration increase in the state of the art systems with an external reservoir. The slope of the linear phase of the concentration increase is dependent on the volume of the fluidic circuitry relative to the permeate flux. Therefore, the slope can be predetermined. In this example at a time of 30 min the concentration is increased from a start concentration of 1 mg/ml to an actual concentration of 2.6 mg/ml. After a time of 232 min the exponential increase starts so that at a time of 248 min the concentration has a value of 125 mg/ml. It is obvious that the low increase at the start phase of the process reduces the risk of a clogging and fouling of the filtration membrane. The advantageous exponential behavior can be shifted in its starting point and starts thereafter. So, the concentration increases very fast after this transition point. The further advantage of the filtration system according to the invention is that the minimal working volume is quite low due to the small volume of the reservoir R2 integrated in the circuitry. So, the maximal receivable concentration rate is distinctly higher.

Figure 4:
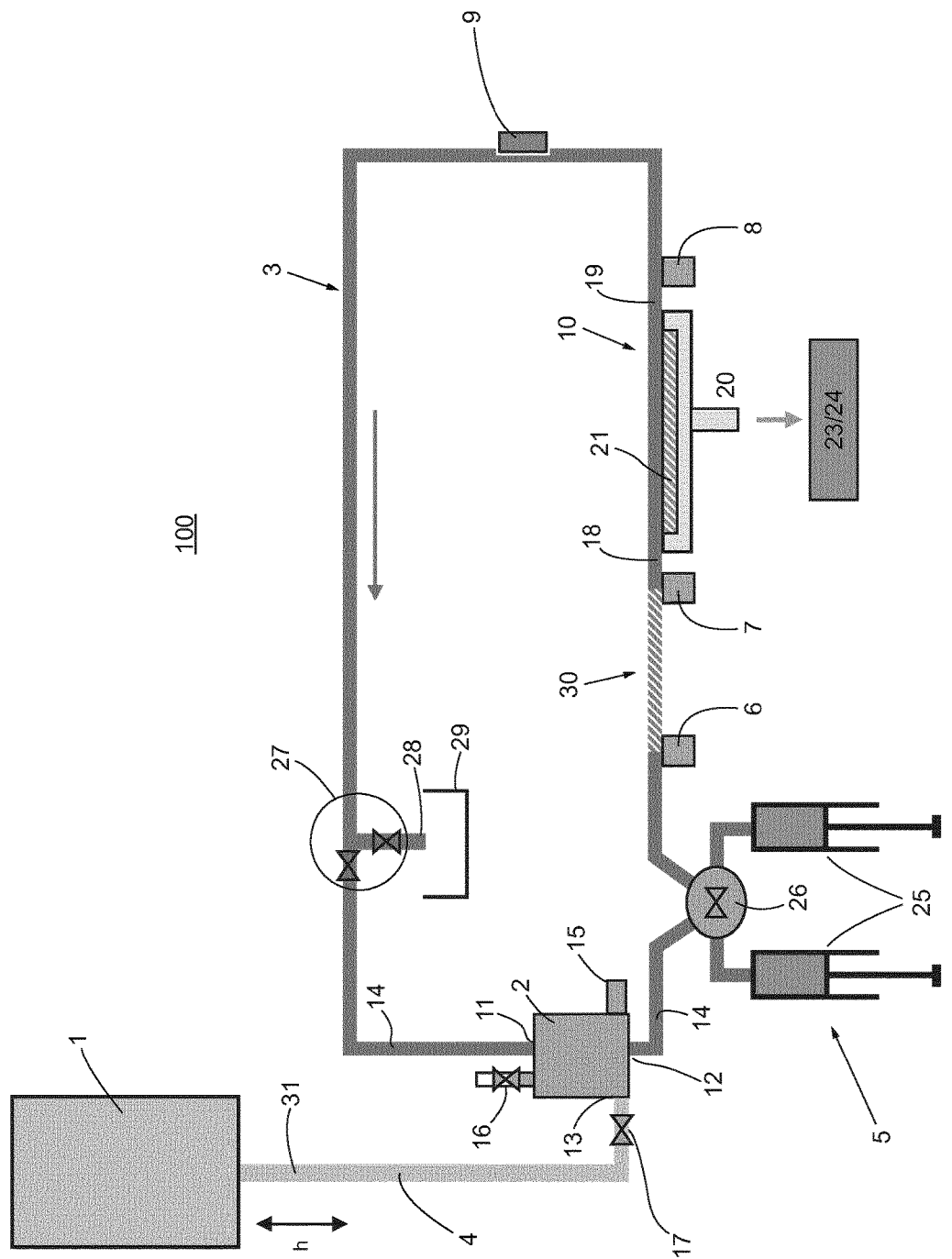
FIG. 4 shows an advanced micro tangential flow filtration system according to the invention which is used for small fluid batches of approximately 10 to 15 ml start volume.

FIG. 4 shows a preferred embodiment of the flow filtration system 100 according to the invention. The system comprises a first reservoir 1 which is located outside a circuitry 3. The circuitry 3 comprises a second reservoir 2, a pump module 5, three pressure sensors 6, 7, 8, a pressure regulator 9 and a micro tangential flow filtration module 10.

The system 100 shown here is a lab scale system in which the reservoir 1 has a volume of 10 to 15 ml. Preferably the volume of the first reservoir 1 has a volume of 15 ml so that a fluid with a volume of 10 ml can be easily contained in the reservoir 1. The first reservoir 1 (reservoir 1) is a discrete element or component like a tank or a container. It is arranged outside the circuitry 3. The first reservoir 1 is connected via a connection conduit 31 with the circuitry 3. The connection conduit 31 is the only fluid connection between the reservoir 1 and the circuitry 3. It prevents that fluid is flowing from the circuitry 3 back to the reservoir 1. As shown in FIG. 4, as an example, the reservoir 1 is directly connected to the reservoir 2 via a direct-line conduit 4 which has the form of a tube or preferably of a pipe.

The second reservoir 2 (reservoir 2) has a reservoir inlet 11 which can be located at the upper area of the reservoir 2, at one of the side walls or preferably at the bottom of reservoir 2, and a reservoir outlet 12, which is preferably located at the bottom of the reservoir 2 or near the bottom. The reservoir inlet 11 and reservoir outlet 12 are connected to the conduits 14 of the circuitry 3. A second reservoir inlet 13 is connected to the direct-line conduit 4 so that fluid contained in the reservoir 1 can flow directly into the reservoir 2.

A valve 17 in the direct-line conduit 4 allows to control the flow of fluid from the first reservoir 1 into the second reservoir 2. Using the valve 17 allows to control the flow from the first fluid reservoir 1 into the circuitry 3. The predetermined pressure in the fluidic circuitry can be measured using one or more of the pressure sensors 6, 7 and 8.

A liquid level sensor 15 installed near the bottom of the reservoir 2 can measure the amount of liquid contained in reservoir 2 so that a control of the fluid level in reservoir 2 can take place. Reservoir 2 is preferably a closed reservoir so that the top of the reservoir 2 is sealed with a cap or a lid.

Reservoir 2, which can have the form of a tank, comprises preferably a vent 16 to allow the removing of gas (e.g. air) from the inside of the reservoir 2. The vent 16 can allow air to enter the reservoir 2 in the phase of the processing when the reservoir 1 is depleted and also reservoir 2 starts to be depleted due to a continuous permeate stream through which fluid is withdrawn of the circuitry 3. Further, after depletion of reservoir 1 gas can flow from reservoir 1 to reservoir 2 if valve 17 is open.

The micro TFF-module 10 comprises a feed inlet 18, a retentate outlet 19, a permeate outlet 20 and a semipermeable membrane 21 capable of separating the fluid sample of the circuitry 3 into a retentate stream and a permeate stream upon passage of the fluid sample into the TFF-module 10 through the inlet feed 18. During operation of the system a continuous flow of fluid is driven through the circuitry and the conduits 14 connecting the elements of the circuitry 3 and forming the circuitry 3 together with the integrated elements. The conduits 14 are preferably flexible tubings or alternatively rigid pipes or are an integral part of a microstructured module.

In the TFF-module 10 preferably a membrane 21 is used for which the separation time depends on the sample volume and the flux through the membrane. In the given example the membrane allows a flux of 0.06 ml/min. The permeate stream is withdrawn through the permeate outlet 20 so that the withdrawn fluid can be collected in a collection chamber 23. The collected fluid amount can easily be measured using a balance 24.

The pump module 5 comprises two syringes 25 and a valve 26. Using an electronic pump steering device and the two syringes 25 which can work alternatingly allows a continuous flow of the fluid sample through the circuitry 3. The fluid is circulated in a loop, so that a retentate stream of the TFF-module 10 is recirculated into the second reservoir 2 and to the TFF-module 10 again. The flow through the circuitry 3 can also be controlled using the valve 26.

The pressure sensors 6 and 7 are used to measure a pressure difference. They are preferably located between the pump module 5 and the TFF-module 10. The sensors are located at a non-shown capillary or a channel which has a defined cross sectional area which is different from the cross sectional area of the conduits 14 of the circuitry 3. The difference of the pressure value of the two pressure sensors 6, 7 is used to determine the viscosity of the fluid sample by applying the Hagen-Poiseuille equation.

The third pressure sensor 8 is located in flow direction behind the filtration module 10. Comparing the measuring values of the pressure sensors 7 and 8 allows to determine the pressure decrease over the filtration module. The information of the pressure sensors 6, 7 and 8 can be used to control and monitor the pressure inside the circuitry 3—and especially the transmembrane pressure which is applied to the membrane 21—by controlling and adjusting the pressure regulator 9, which is preferably also a valve.

An outlet valve 27 featuring two ports allows to withdraw fluid from the circuitry and close the circuitry so that a fluid is pumped not through the circuitry 3 but through the outlet port 28 of the outlet valve 27. So, the desired solution with the high concentration of the component can be collected in a result chamber 29 which is connected to the outlet port 28. In the shown embodiment, the outlet valve 27 comprises two valves which work together to provide the three-way valve functionality of the output valve 27.

Preferably the circuitry 3 also comprises an optical measuring device for determining the concentration of the components contained in the fluid. The optical measuring device comprises preferably a cuvette 30 which allows an online detection of the concentration of the components in the solution. So, the actual concentration of the components can be monitored. The result of the monitoring can be used as a stop criterion to stop the fluid flow in the circuitry 3 and to stop the filtration process as soon as a predetermined concentration rate is reached. The cuvette 30 can also be used as a transparent capillary between the pressure sensors 6, 7 for measuring the viscosity. So, the cuvette has the function of a fluid channel or capillary over which length a pressure drop can be detected.

The fluid system shown in FIG. 4 has a start volume of the fluid contained in the system 100 of 15 ml. 13.9 ml of the start volume are contained in reservoir 1. Reservoir 2 contains 1 ml of the volume, the remaining components of the circuitry 3 contains 100 µl. The start concentration is 1 mg/ml. So, the first reservoir 1 has a volume which is at least 10 times larger than the volume of reservoir 2, approximately 15 times larger. In other embodiments the second reservoir 2 has a volume of at most 0.7 ml and preferably of at most 0.5 ml. So, the volume of reservoir 1 is more than 20 times larger than the volume of reservoir 2.

Due to the relatively small volume of the second reservoir 2 compared with the first reservoir 1 the minimal working volume of the circuitry 3 is decreased. It is preferably at most 1 ml, further preferably at most 700 µl and also further preferably at most 500 µl. A minimal working volume of at most 200 µl is particularly preferably, also a minimal working volume of at most 100 µl. Due to these minimal working volumes which can be attained with the system 100 according to the invention, a maximum increase factor in concentration of preferably at least 2, further preferably of at least 10, further preferably of at least 20, further preferably 50, further preferably of at least 100 and particularly preferably of at least 150 can be reached. The system shown in FIG. 4 allows an increase factor in concentration by a factor of at least 100.

The invention claimed is:

1. A micro flow filtration system, wherein the system (100) comprises a fluid circuitry (3) and first reservoir (1) outside of the circuitry (3) suitable for containing a fluid, the fluid circuitry (3) comprising:
   a tangential flow filtration module (10) (TFF-module) having a feed inlet (18), a retentate outlet (19), a permeate outlet (20) and a semipermeable membrane (21) capable of separating the fluid sample into a retentate stream and a permeate stream upon passage of the fluid sample into the tangential flow filtration module (10) through the feed inlet,
   a second reservoir (2) integrated into the fluid circuitry (3) having a reservoir inlet (11) and reservoir outlet (12) both in connection to the circuitry (3),
   a pump (5) for creating and driving a fluid flow of the fluid sample through the fluid circuitry (3) and the tangential flow filtration module (10),
   a plurality of conduits (14) forming the fluid circuitry, through which a fluid stream of the fluid sample is conducted, together with the second reservoir (2), the TFF-module (10) and the pump (5);
wherein
   the volume of the outside first reservoir (1) is significantly larger than the volume of the second reservoir (2);
   the first reservoir (1) outside of the circuitry (3) is connected to the circuitry (3) via connection conduit (31) wherein the connection conduit (31) only allows that the fluid flows unidirectionally out of the first reservoir (1) into the circuitry (3), wherein the connection conduit (31) comprises a back-pressure valve so that fluid is prevented from flowing back from the circuitry (3) into the first reservoir (1);
   the concentration of the fluid in the first reservoir (1) is constant; and
   the micro flow filtration system has a concentration factor of at least 100.

2. The micro flow filtration system according to claim 1, characterized in that the volume of the first reservoir (1) is at least two times larger than the volume of the circuitry (3).

3. The micro flow filtration system according to claim 1, characterized in that the second reservoir (2) is a discrete fluidic element or that the functionality of the second reservoir (2) is provided by another structural element of the fluidic circuitry (3).

4. A micro flow filtration system, wherein the system (100) comprises a fluid circuitry (3) and first reservoir (1) outside of the circuitry (3) suitable for containing a fluid, the fluid circuitry (3) comprising:
   a tangential flow filtration module (10) (TFF-module) having a feed inlet (18), a retentate outlet (19), a permeate outlet (20) and a semipermeable membrane (21) capable of separating the fluid sample into a retentate stream and a permeate stream upon passage of the fluid sample into the tangential flow filtration module (10) through the feed inlet,
   a second reservoir (2) integrated into the fluid circuitry (3) having a reservoir inlet (11) and reservoir outlet (12) both in connection to the circuitry (3), a pump (5) for creating and driving a fluid flow of the fluid sample through the fluid circuitry (3) and the tangential flow filtration module (10), a plurality of conduits (14) forming the fluid circuitry, through which a fluid stream of the fluid sample is conducted, together with the second reservoir (2), the TFF-module (10) and the pump (5);

wherein the volume of the outside first reservoir (1) is significantly larger than the volume of the second reservoir (2);

the first reservoir (1) outside of the circuitry (3) is connected to the circuitry (3) via connection conduit (31) wherein connection conduit (31) only allows that the fluid flows unidirectionally out of the first reservoir (1) into the circuitry (3), wherein the connection conduit (31) comprises a back-pressure valve so that fluid is prevented from flowing back from the circuitry (3) into the first reservoir (1) and wherein the concentration of the fluid in the first reservoir (1) is constant, characterized in that the first reservoir (1) and the second reservoir (2) contain the same fluid sample.

5. The micro flow filtration system according to claim 1, characterized in that the system comprises at least one of the pressure sensors (6, 7, 8).

6. The micro flow filtration system according to claim 1, characterized in that the circuitry (3) comprises an optical measuring device (30) for acquiring information about the concentration of the components contained in the fluid sample.

7. The micro flow filtration system according to claim 1, characterized in that the system comprises a pressure regulation means (9) for regulating the transmembrane pressure and the pressure in the fluidic circuitry.

8. The micro flow filtration system according to claim 1, characterized in that the first reservoir (1) and the second reservoir (2) are in fluid connection in such a manner that the fluid sample of the first reservoir (1) flows directly into the second reservoir (2).

9. A micro flow filtration system, wherein the system (100) comprises a fluid circuitry (3) and first reservoir (1) outside of the circuitry (3) suitable for containing a fluid, the fluid circuitry (3) comprising:

a tangential flow filtration module (10) (TFF-module) having a feed inlet (18), a retentate outlet (19), a permeate outlet (20) and a semipermeable membrane (21) capable of separating the fluid sample into a retentate stream and a permeate stream upon passage of the fluid sample into the tangential flow filtration module (10) through the feed inlet, a second reservoir (2) integrated into the fluid circuitry (3) having a reservoir inlet (11) and reservoir outlet (12) both in connection to the circuitry (3), a pump (5) for creating and driving a fluid flow of the fluid sample through the fluid circuitry (3) and the tangential flow filtration module (10), a plurality of conduits (14) forming the fluid circuitry, through which a fluid stream of the fluid sample is conducted, together with the second reservoir (2), the TFF-module (10) and the pump (5);

wherein the volume of the outside first reservoir (1) is significantly larger than the volume of the second reservoir (2);

the first reservoir (1) outside of the circuitry (3) is connected to the circuitry (3) via connection conduit (31) wherein connection conduit (31) only allows that the fluid flows unidirectionally out of the first reservoir (1) into the circuitry (3), wherein the connection conduit (31) comprises a back-pressure valve so that fluid is prevented from flowing back from the circuitry (3) into the first reservoir (1) and wherein the concentration of the fluid in the first reservoir (1) is constant characterized in that the first reservoir (1) is a discrete element.

10. The micro flow filtration system according to claim 1, characterized in that the connection conduit (31) is a capillary or a capillary channel or a tube and/or the connection conduit (31) has a length of at least 10 mm.

11. The micro flow filtration system according to claim 1, characterized in that the connection conduit (31) has a diameter of at most 1 mm.

12. A flow filtration method for increasing the concentration of a component contained in a fluid sample using a tangential flow filtration module (10), the method comprising the following steps:

providing a micro flow filtration system (100), comprising a first reservoir (1) and a fluid circuitry (3), wherein the first reservoir (1) is connected via a connection conduit (31) with the circuitry (3) in such a manner that fluid flows unidirectionally from the first reservoir (1) to the circuitry, wherein the connection conduit (31) comprise a back-pressure valve so that fluid is prevented from flowing back from the circuitry (3) into the first reservoir (1) and wherein the concentration of the fluid in the first reservoir (1) is constant, the circuitry comprising:

the micro tangential fluid filtration-module (10) having a feed inlet (18), a retentate outlet (19) and a permeate outlet (20), and a membrane (21) capable for separating the fluid sample into a retentate stream and a permeate stream, a second reservoir (2) integrated into the fluid circuitry (3) having a reservoir inlet (11) and a reservoir outlet (12) both being connected to the circuitry (3), a pump (5) for creating and driving a fluid flow of the fluid sample through the fluid circuitry (3), a plurality of conduits (14) forming the fluid circuitry (3), through which a fluid stream of the fluid sample is conducted, together with the second reservoir (2), the TFF-module (10) and the pump (5)

wherein the volume of the first reservoir (1) is significantly larger than the volume of the second reservoir (2), filling at least the first reservoir (1) with a fluid sample, driving the fluid sample through the circuitry (3) and passing the TFF-module (10) thereby increasing the concentration of the components in the fluid sample in the circuitry (3) and withdrawing an amount of fluid in a permeate stream, establishing a flow of fluid from the first reservoir (1) into the circuitry (3) via the connection conduit (31).

13. The flow filtration method according to claim 12, characterized in monitoring the concentration of the components in the fluid sample and/or the physical properties of the fluid sample.

14. The flow filtration method according to claim 12, characterized in that increase in concentration of the components contained in the fluid sample is a factor of at least two.

15. The flow filtration method according to claim 12, characterized in that the fluid sample flows out of the first reservoir (1) into the second reservoir (2) of the circuitry (3).

16. The flow filtration method according to claim 12, characterized by the following step:

controlling the flow in the circuitry (3) in such a manner that a predetermined pressure or a predetermined flow in the circuitry (3) is adjusted.

17. The flow filtration method according to claim 12, characterized in that the flow of the fluid from the first reservoir (1) into the circuitry (3) is controlled by a pressure force, or that the respective amount of fluid is sucked out of the first reservoir (1) or a pressure is applied in the first reservoir (1), and/or that the flow is controlled such that a predetermined amount of sample fluid is contained in the circuitry (3) or that the circuitry (3) is completely filled with fluid such that the circuitry (3) is free of air.

18. The flow filtration method according to claim 12, characterized in that the pressure in the system and/or the transmembrane pressure is controlled by a pressure regulation means.

19. The micro flow filtration system according to claim 2, characterized in that the volume of the first reservoir (1) is at least ten times larger than the volume of the circuitry (3).

20. The micro flow filtration system according to claim 2, characterized in that the volume of the first reservoir (1) is at least 50 times larger than the volume of the circuitry (3).

21. The micro flow filtration system according to claim 2, characterized in that the volume of the first reservoir (1) is at least 100 times larger than the volume of the circuitry (3).

22. The micro flow filtration system according to claim 2, characterized in that the volume of the first reservoir (1) is at least 1000 times larger than the volume of the circuitry (3).

23. The micro flow filtration system according to claim 5, characterized in that the system comprises at least two pressure sensors (6, 7, 8).

24. The micro flow filtration system according to claim 5, characterized in that at least one pressure sensor (6, 7, 8) is used for acquiring information about the transmembrane pressure and/or the physical properties.

25. The micro flow filtration system according to claim 5, characterized in that the at least one pressure sensor (6, 7, 8) is used for acquiring information about the viscosity of the fluid sample.

26. The micro flow filtration system according to claim 8, characterized in that the first reservoir (1) and the second reservoir (2) are in fluid connection in such a manner that the fluid sample of the first reservoir (1) flows directly into the second reservoir (2 via a direct-line connection conduit (4).

27. The micro flow filtration system according to claim 9, characterized in that the first reservoir (1) is detachable from the circuitry (3) and/or from the second reservoir (2).

28. The micro flow filtration system according to claim 10, characterized in that the connection conduit (31) is a capillary or a capillary channel or a tube and/or the connection conduit (31) has a length of at least 50 mm.

29. The micro flow filtration system according to claim 10, characterized in that the connection conduit (31) is a capillary or a capillary channel or a tube and/or the connection conduit (31) has a length of at least 100 mm.

30. The micro flow filtration system according to claim 10, characterized in that the connection conduit (31) is a capillary or a capillary channel or a tube and/or the connection conduit (31) has a length of at least 200 mm.

31. The micro flow filtration system according to claim 11, characterized in that the connection conduit (31) has a diameter of at most 0.75 mm.

32. The micro flow filtration system according to claim 11, characterized in that the connection conduit (31) has a diameter of at most 0.5 mm.

33. The flow filtration method according to claim 14, characterized in that increase in concentration of the components contained in the fluid sample is a factor of at least 10.

34. The flow filtration method according to claim 14, characterized in that increase in concentration of the components contained in the fluid sample is a factor of at least 50.

35. The flow filtration method according to claim 14, characterized in that increase in concentration of the components contained in the fluid sample is a factor of at least 100.

36. The flow filtration method according to claim 14, characterized in that increase in concentration of the components contained in the fluid sample is a factor of at least 1000.

37. The flow filtration method according to claim 17, characterized in that the flow of the fluid from the first reservoir (1) into the circuitry (3) is controlled by an under-pressure.

38. The flow filtration method according to claim 17, characterized in that the flow of the fluid from the first reservoir (1) into the circuitry (3) is controlled by a pressure force generated by the pump.

39. The flow filtration system according to claim 12, wherein the flow of fluid from the first reservoir (1) into the circuitry (3) via the connection conduit (31) is a continuous flow so that the amount of fluid withdrawn from the circuitry (3) as permeate stream is balanced during operation of the system.

* * * * *